United States Patent
Huang et al.

(10) Patent No.: US 9,306,463 B2
(45) Date of Patent: Apr. 5, 2016

(54) FULL-BRIDGE QUASI RESONANT DC-DC CONVERTER AND DRIVING METHOD THEREOF

(71) Applicant: Industrial Technology Research Institute, Hsinchu Hsien (TW)

(72) Inventors: Shu-Syuan Huang, Hsinchu (TW); Pao-Chuan Lin, Hsinchu (TW); Po-Li Chen, Hsinchu (TW)

(73) Assignee: INDUSTRIAL TECHNOLOGY RESEARCH INSTITUTE, Hsinchu Hsien (TW)

( * ) Notice: Subject to any disclaimer, the term of this patent is extended or adjusted under 35 U.S.C. 154(b) by 580 days.

(21) Appl. No.: 13/705,029

(22) Filed: Dec. 4, 2012

(65) Prior Publication Data

US 2014/0078783 A1    Mar. 20, 2014

(30) Foreign Application Priority Data

Sep. 19, 2012 (TW) .............................. 101134235 A

(51) Int. Cl.
*H02M 3/335* (2006.01)
*H02M 7/5387* (2007.01)

(52) U.S. Cl.
CPC ........ *H02M 3/33576* (2013.01); *H02M 7/5387* (2013.01); *Y02B 70/1433* (2013.01)

(58) Field of Classification Search
CPC ........... H02M 3/33576; H02M 7/5387; Y02B 70/1433
USPC .............................................. 363/17, 98, 132
See application file for complete search history.

(56) References Cited

U.S. PATENT DOCUMENTS 6,316,881 B1 * 11/2001 Shannon et al. .............. 315/219
7,167,384 B2 * 1/2007 Yasumura ..................... 363/127
(Continued)

FOREIGN PATENT DOCUMENTS

| TW | 201041283 | 11/2010 |
| TW | 201238221 A1 | 9/2012 |
| WO | WO 2006/027744 A2 | 3/2006 |
| WO | WO2007145388 | 12/2007 |

OTHER PUBLICATIONS

Yung-Fu Hunag et al. "Series resonant type soft-switching grid-connected single-phase inverter employing discontinuousresonant control applied to photovoltaic AC module", Applied Power Electronics Conference and Exposition (APEC), 2011 Twenty-Sixth Annual IEEE, pp. 989-994.

(Continued)

*Primary Examiner* — Jessica Han
(74) *Attorney, Agent, or Firm* — Muncy, Geissler, Olds & Lowe, P.C.

(57) ABSTRACT

A full-bridge quasi-resonant DC-DC converter is provided, including a transformer having a primary winding and a secondary winding, a full-bridge converting circuit electrically connected with the primary winding of the transformer, a resonant capacitor provided between the full-bridge converting circuit and the primary winding, a rectifier circuit electrically connected with the secondary winding of the transformer, and a resonant inductor connected in series with the rectifier circuit. Therefore, the full-bridge quasi-resonant DC-DC converter reduces the switching losses of the switching elements and effectively reduces the size of the converter, while increases the conversion efficiency.

12 Claims, 9 Drawing Sheets

(56) References Cited

U.S. PATENT DOCUMENTS

| | | | |
|---|---|---|---|
| 7,656,692 B2* | 2/2010 | Sadwick et al. | 363/89 |
| 8,188,830 B2 | 5/2012 | Nakahori | |
| 2002/0064058 A1* | 5/2002 | Zhang et al. | 363/17 |
| 2007/0195562 A1 | 8/2007 | Sato | |
| 2011/0299301 A1 | 12/2011 | Huang | |
| 2012/0026755 A1 | 2/2012 | Wu et al. | |
| 2012/0039092 A1 | 2/2012 | Xu et al. | |
| 2012/0229034 A1* | 9/2012 | Yu et al. | 315/186 |
| 2014/0268899 A1* | 9/2014 | Hosotani | 363/17 |

OTHER PUBLICATIONS

S.-Y. Tseng et al., "Multi-switch Driving Circuit with LLC Resonant Circuit for High Pulsed-Voltage Generator", Power Electronics and Drive Systems (PEDS), 2011 IEEE Ninth International Conference on, pp. 803-808.

Chien-Ming Wang e tal., "A soft-Swtiched Aeries-Resonant DC/AC Inverter Without Auxiliary Switches", Conference Publications; 2002, pp. 827-832, vl2.

Yu-Kang Lo et al., "Phased-Shifted Full Bridge Series-Resonant DC-DC Converters for Wide Load Variations", Industrial Electronics, IEEE Transactions on vol. 58, Issue: 6, Publication Year: 2011, pp. 2572-2575.

Esteve, V. et al., "Improving the Efficiency of IGBT Series-Resonant Inverters Using Pulse Density Modulation", Industrial Electronics, IEEE Transactions on vol. 58, Issue: 3, Publication Year: 2011, pp. 979-987.

Nunb Filipe Fereia et al., "Supra Resonant Fixed Frequency Full Bridge DC-DC Resonant Converter with Reduced Switching Losses", Publication Year: 1996, pp. 833-839.

* cited by examiner

FULL-BRIDGE QUASI RESONANT DC-DC CONVERTER AND DRIVING METHOD THEREOF

BACKGROUND

1. Technical Field

The present invention relates to DC-DC converters, and, more particularly, to a full-bridge quasi-resonant DC-DC converter.

2. Description of Related Art

Due to the growing international energy demand, increasing scarcity of non-renewable energy such as oil and climate changes and other issues, the development of clean and renewable energy source, such as solar energy, wind energy, ocean (tidal or temperature difference), hydro, geothermal, biomass energy and the like, is imminent. In general, clean renewable energy is a less stable source of energy. Therefore, the conversion of this unstable energy through energy conversion device to energy that can be used for households or industries is a key for the development of renewable energy.

Full-bridge DC-DC converters have a wide operating range (maximum input voltage to minimum input voltage), making the circuit more flexible in design, and therefore are common application architectures. However, traditional full-bridge DC-DC converters adopt hard switching, and since switching is in an ideal state, the switching elements will create switching losses when they are turned on and turned off. Also, line equivalent inductance tends to produce surge voltage on the switching elements, reducing the life of the switching elements.

In order to solve the problems associated with hard switching, resonant circuits are used to reduce the voltage and current stress of the switching elements. Nevertheless, the resonant inductor of a traditional resonant circuit is typically at the primary winding of the converter. When the primary side is in a state of low-voltage and high current, the design of the resonant inductor can be difficult and inefficient.

Therefore, how to provide a DC-DC converter that enables soft switching and reduces line losses of the resonant inductor has become an important issue to be solved by those skilled in the art.

SUMMARY

The present disclosure provides a full-bridge quasi-resonant DC-DC converter, which includes: a transformer, a full-bridge converting circuit and a resonant inductor, wherein the transformer includes a primary winding and a secondary winding, the full-bridge converting circuit includes a first arm circuit having a first switching element disposed at a first upper arm and a second switching element disposed at a first lower arm and connected in series with the first switching element, a second arm circuit connected in parallel with the first arm circuit, and having a third switching element disposed at a second upper arm and a fourth switching element disposed at a second lower arm and connected in series with the third switching element, an input end, an output end electrically connected with the primary winding of the transformer, and a resonant capacitor provided between the first arm circuit or the second arm circuit and the primary winding, the rectifier circuit is electrically connected with the secondary winding of the transformer for rectifying signals generated by the secondary winding to produce output signals, the resonant inductor connected in series with the rectifier circuit, and the resonant inductor and the resonant capacitor form a resonant circuit.

The present disclosure further provides a driving method of soft-switching the full-bridge quasi-resonant DC-DC converter. The method includes the steps of: (1) turning on the first switching element at the first upper arm and the fourth switching element at the second lower arm so as to transfer electrical energy received at the input end of the full-bridge converting circuit from the primary winding of the transformer to the secondary winding, and charging the resonance capacitor; (2) when no current flows through the first switching element and the fourth switching element, turning off one of the first switching element and the fourth switching element to achieve zero-current switching, and turning on one of the second switching element and the third switching element in order to transfer the electrical energy stored in the resonant capacitor during step (1) to the secondary winding; (3) after going through a preset power-off output region, turning on the third switching element or the second switching element that is not yet turned on during step (2) to again transfer the electrical energy received at the input end from the primary winding of the transformer to the secondary winding, and charging the resonant capacitor; and (4) when no current flows through the second switching element and the third switching element, turning off one of the second switching element and the third switching element to achieve zero-current switching, and turning on the first switching element or the fourth switching element in order to again transfer the electrical energy stored in the resonant capacitor during step (3) to the secondary winding.

In the driving method of soft switching the full-bridge quasi-resonant DC-DC converter, the method may alternatively include, in step (1), first turning on the second switching element and the third switching element, and then in step (2) turning off one of the second switching element and the third switching element to achieve zero-current switching, and turning on one of the first switching element and the fourth switching element. Then, after going through a preset power-off output region, turning on the fourth switching element or the first switching element that is not yet turned on during step (2), and then when no current flows through the first switching element and the fourth switching element, turning off one of the first switching element and the fourth switching element to achieve zero-current switching, and turning on the second switching element or the third switching element. This can achieve a result similar to the above driving method of the above full-bridge quasi-resonant DC-DC converter.

The present disclosure further provides another driving method of soft-switching the full-bridge quasi-resonant DC-DC converter. The method includes the steps of: (1) turning on the first switching element at the first upper arm and the fourth switching element at the second lower arm so as to transfer electrical energy received at the input end of the full-bridge converting circuit from the primary winding of the transformer to the secondary winding, and charging the resonance capacitor; (2) when no current flows through the first switching element and the fourth switching element, turning off the first switching element and the fourth switching element to achieve zero-current switching, and turning on the second switching element and the third switching element in order to continuously transfer the electrical energy received at the input end of the full-bridge converting circuit from the primary winding of the transformer to the secondary winding, and charging the resonant capacitor; and (3) when no current flows through the second switching element and the third switching element, turning off one of the second switching element and the third switching element to achieve zero-current switching, and turning on the first switching element or the fourth switching element in order to transfer the electrical energy stored in the resonant capacitor during step (1) and step (2) to the secondary winding.

In the another driving method of soft switching the full-bridge quasi-resonant DC-DC converter, the method may alternatively include, in step (1), first turning on the second switching element and the third switching element, and then in step (2) turning off the second switching element and the third switching element to achieve zero-current switching, and turning on the first switching element and the fourth switching element, and then when no current flows through the first switching element and the fourth switching element, turning off one of the first switching element and the fourth switching element to achieve zero-current switching, and turning on the second switching element or the third switching element. This can achieve a result similar to the above another driving method of the full-bridge quasi-resonant DC-DC converter.

Compared to the prior art, the full-bridge quasi-resonant DC-DC converter of the present disclosure shifts the resonant inductor to the secondary side, and together with the soft-switching driving methods, effectively reduces the switching losses of the switching elements as well as the size of the resonant inductor, and lowers the average peak current, thereby improving the overall conversion efficiency of the converter.

BRIEF DESCRIPTION OF DRAWINGS

The present invention can be more fully understood by reading the following detailed description of the preferred embodiments, with reference made to the accompanying drawings, wherein.

DETAILED DESCRIPTION

Figure 1:
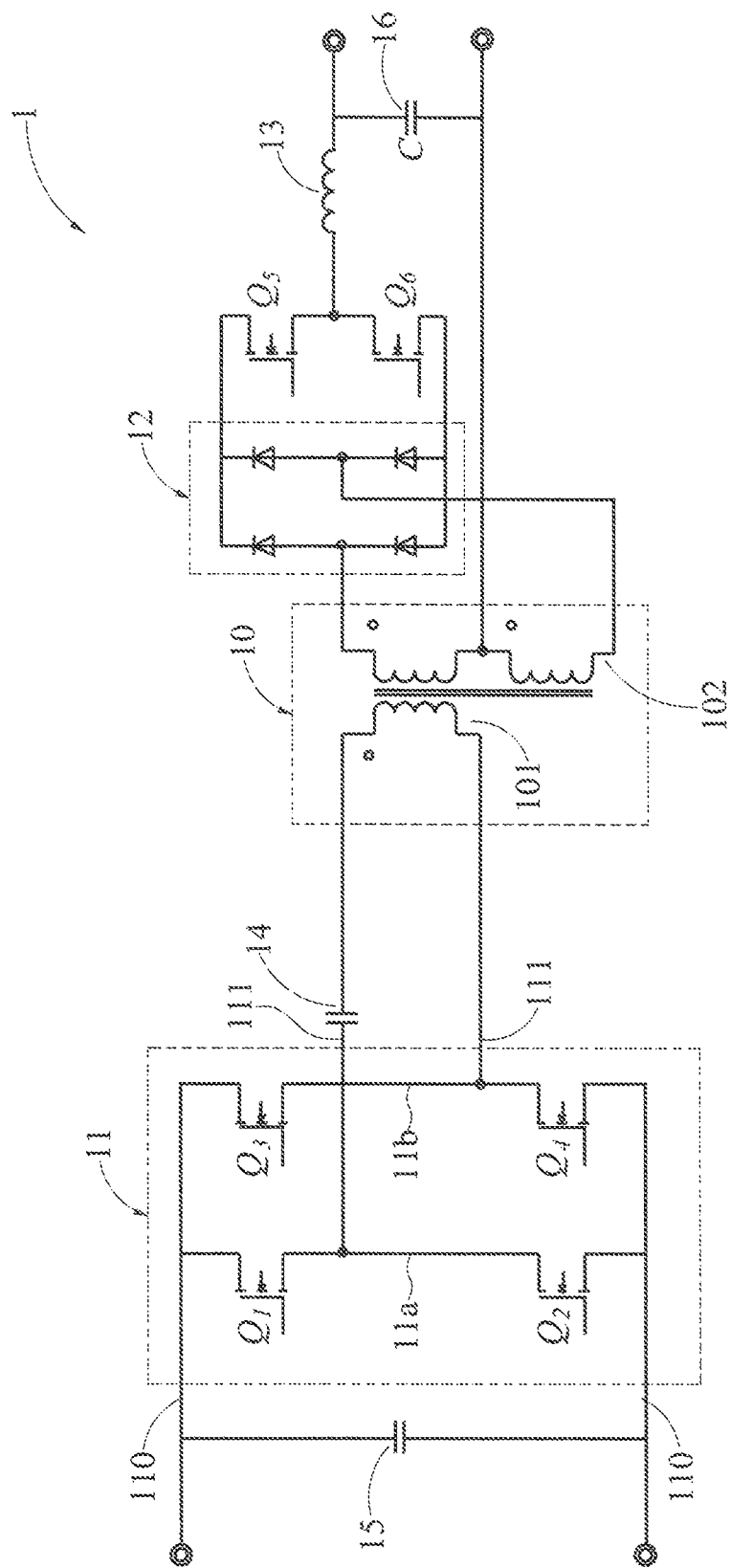
FIG. 1 is a circuit diagram of a full-bridge quasi-resonant DC-DC converter in accordance with an embodiment of the present disclosure.

In the following detailed description, for purposes of explanation, numerous specific details are set forth in order to provide a through understanding of the disclosed embodiments. It will be apparent, however, that one or more embodiments may be practiced without these specific details. In other instances, well-known structures and devices are schematically shown in order to simplify the drawing.

FIG. 1 is a circuit diagram of a full-bridge quasi-resonant DC-DC converter in accordance with an embodiment of the present disclosure. The full-bridge quasi-resonant DC-DC converter includes a transformer 10, a full-bridge converting circuit 11, a rectifier circuit 12, and a resonant inductor 13.

The transformer 10 has a primary winding 101 and a secondary winding 102. In an embodiment, the primary winding 101 of the transformer 10 has a coil, and the secondary winding 102 of the transformer 10 has two coils connected in series with each other and is a center-tapped winding or divided winding.

The full-bridge converting circuit 11 includes a first arm circuit 11a and a second arm circuit 11b. The first arm circuit 11a has a first switching element Q1 disposed at a first upper arm and a second switching element Q2 disposed at a first lower arm and connected in series with the first switching element Q1. The second arm circuit 11b has a third switching element Q3 disposed at a second upper arm and a fourth switching element Q4 disposed at a second lower arm connected in series with the third switching element Q3. The full-bridge converting circuit 11 further includes an input end 110 and an output end 111. The output end 111 is electrically connected with the primary winding 101 of the transformer 10. A resonant capacitor 14 is provided between the first arm circuit 11a or the second arm circuit 11b and the primary winding 101.

The rectifier circuit 12 is electrically connected with the secondary winding 102 of the transformer 10 for rectifying signals generated by the secondary winding 102 to produce output signals.

In an embodiment, the rectifier circuit 12 is a full-bridge rectifier circuit having four switching elements that can be, for example, diodes or metal oxide-semiconductor field-effect transistors (MOSFET).

In an embodiment, the full-bridge quasi-resonant DC-DC converter 1 further includes a fifth switching element Q5 and a sixth switching element Q6 connected in series with the fifth switching element Q5. The rectifier circuit 12 is connected in parallel with the fifth switching element Q5 and the sixth switching element Q6. The output signals of the rectifier circuit 12 are converted into AC signals through the fifth switching element Q5 and the sixth switching element Q6 in order to be in sync with the mains.

The resonant inductor 13 is connected in series with the rectifier circuit 12. The resonant inductor 13 and the resonant capacitor 14 form a resonant circuit. The resonant inductor 13 is located at a secondary side of the full-bridge quasi-resonant DC-DC converter 1. Since the current at the secondary side is less than that at a primary side, it does not affect the resonant status, and the design of the resonant inductor 13 is relatively simpler and smaller in size.

In an embodiment, the resonant inductor 13 is provided at the secondary side of the transformer 10, and also serves as a filter inductor for filtering the output signals of the rectifier circuit.

In an embodiment, the full-bridge quasi-resonant DC-DC converter 1 further includes a first capacitor 15 electrically connected with the input end 110 of the full-bridge converting circuit 11 for stabilizing the voltage inputted into the full-bridge converting circuit 11.

In an embodiment, the full-bridge quasi-resonant DC-DC converter 1 further includes a second capacitor 16 electrically connected with the rectifier circuit 12 for filtering the output signals of the rectifier circuit 12.

In an embodiment, the first to sixth switching elements are power MOSFETs.

Figure 2A:
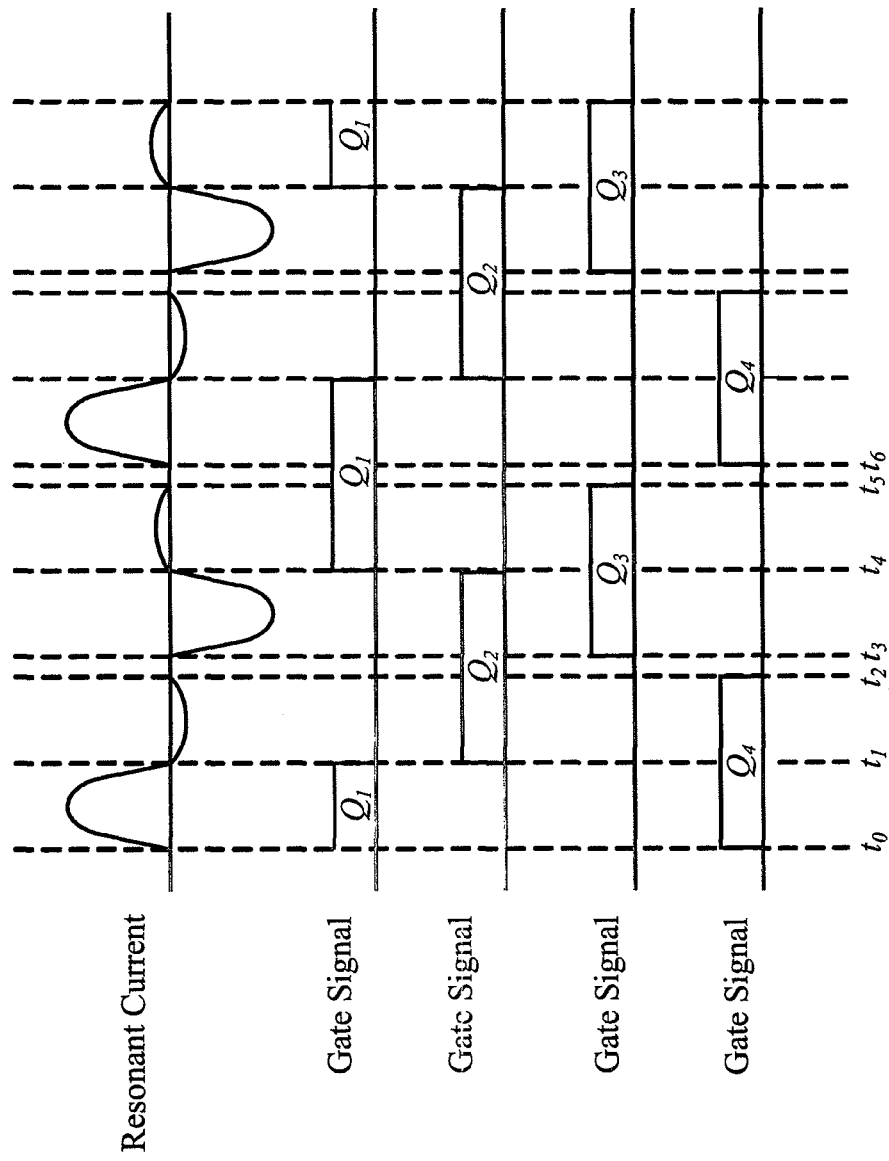
FIGS. 2A to 2D are waveform diagrams illustrating a driving method of soft switching the full-bridge quasi-resonant DC-DC converter in accordance with an embodiment of the present disclosure.
Figure 2B:
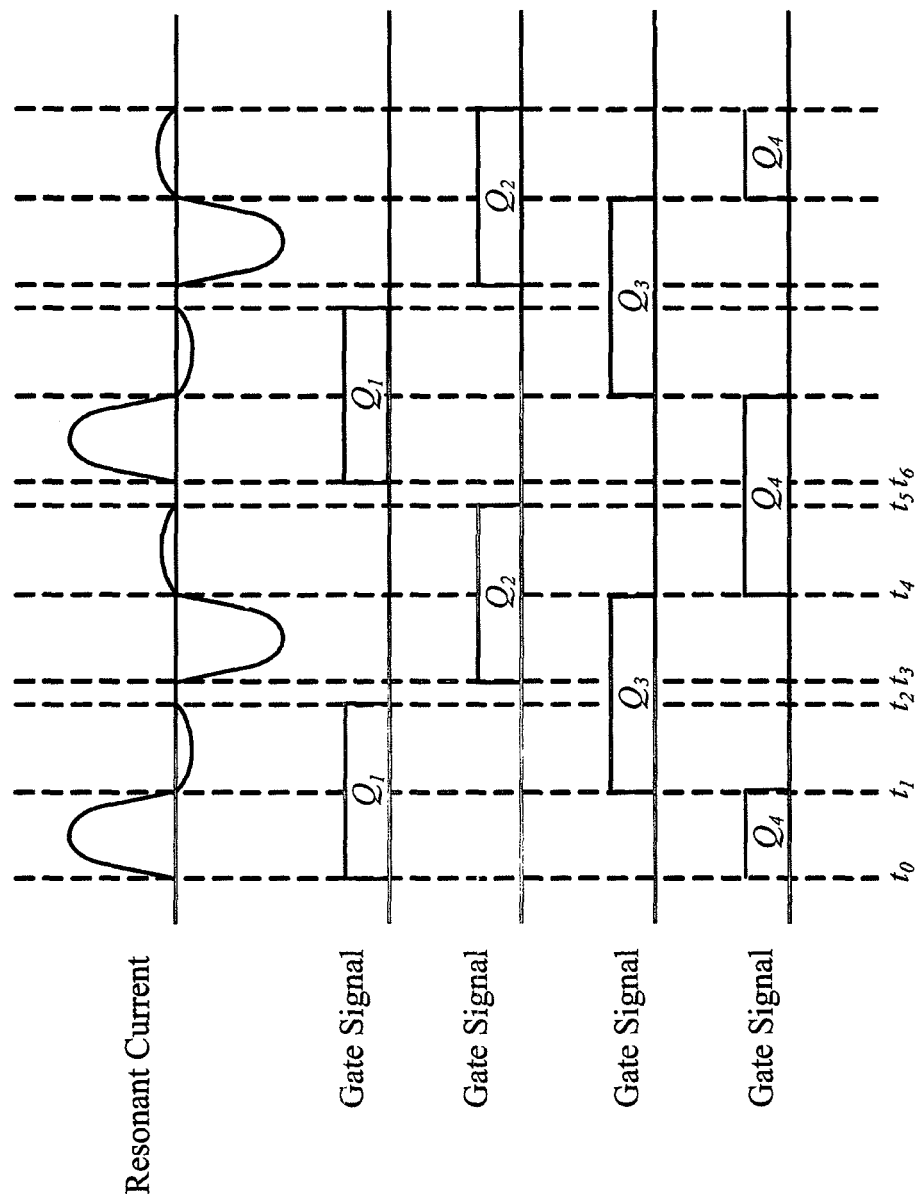

FIGS. 2A to 2D are waveform diagrams illustrating a driving method of soft switching the full-bridge quasi-resonant DC-DC converter in accordance with an embodiment of the present disclosure. As shown in FIGS. 2A and 2B, based on the conduction states of the switching elements, the operations of the circuit is divided into time periods t0 to t6, and the operations in each of the periods t0 to t6 are described as follow:

(1) t0 to t1

The first switching element Q1 disposed at the first upper arm and the fourth switching element Q4 disposed at the second lower arm are turned on, so as to transfer the electrical energy received at the input end 110 of the full-bridge converting circuit 11 from the primary winding 101 to the secondary winding 102, and the resonance capacitor 14 is being charged.

(2) t1 to t2

When no current flows through the first switching element Q1 and the fourth switching element Q4, the first switching element Q1 (see FIG. 2A) or the fourth switching element Q4 (see FIG. 2B) is turned off to achieve zero-current switching, and the second switching element Q2 or the third switching element Q3 is correspondingly turned on in order to again the electrical energy stored in the resonant capacitor 14 to the secondary winding 102.

(3) t2 to t3

This is a preset power-off output region.

(4) t3 to t4

After the preset power-off output region, the third switching element Q3 or the second switching element Q2 that is not yet turned on during the period of t1 to t2 is turned on to again transfer the electrical energy received at the input end 110 from the primary winding 101 to the secondary winding 102, and the resonant capacitor 14 is being charged.

(5) t4 to t5

When no current flows through the second switching element Q2 and the third switching element Q3, the second switching element Q2 (see FIG. 2A) or the third switching element Q3 (see FIG. 2B) is turned off to achieve zero-current switching, and the first switching element Q1 or the fourth switching element Q4 is correspondingly turned on in order to again transfer the electrical energy stored in the resonant capacitor 14 to the secondary winding 102.

(6) t5 to t6

Similarly, this is another preset power-off output region.

Figure 2C:
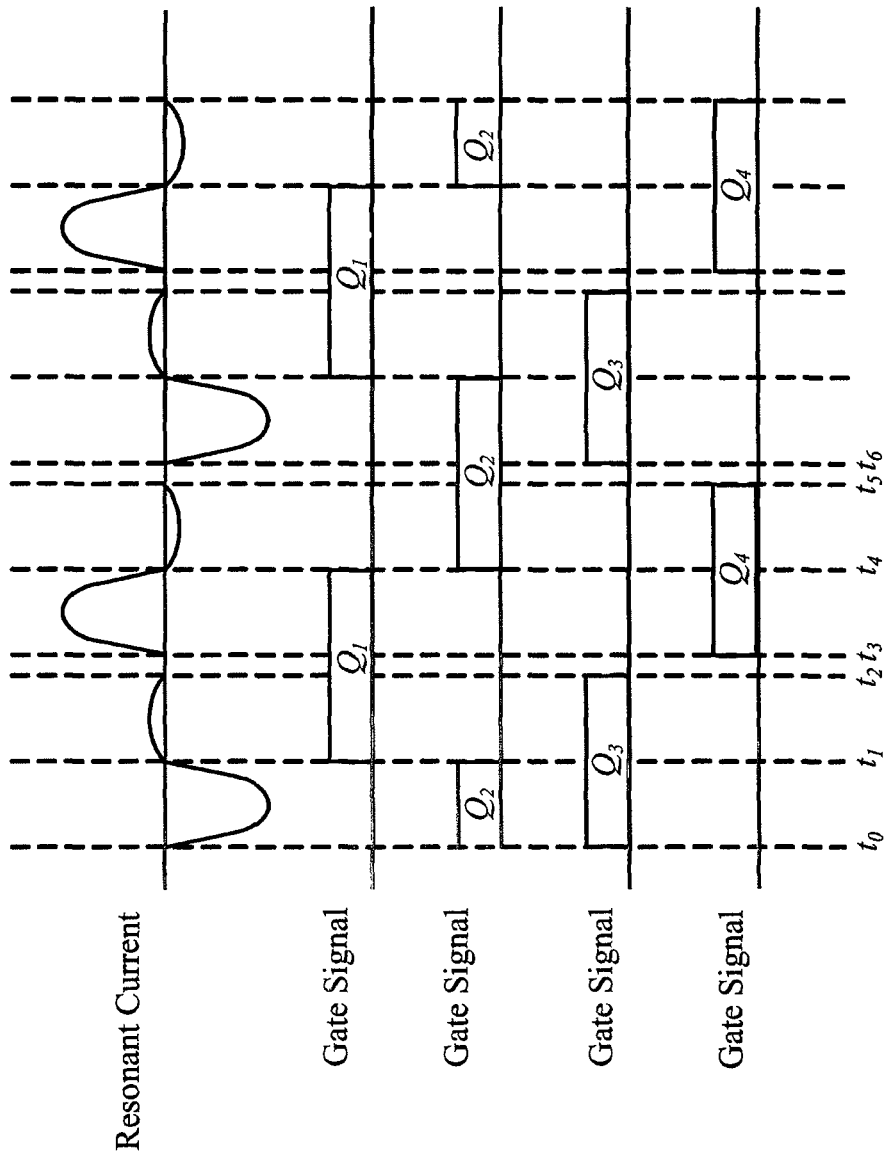
Figure 2D:
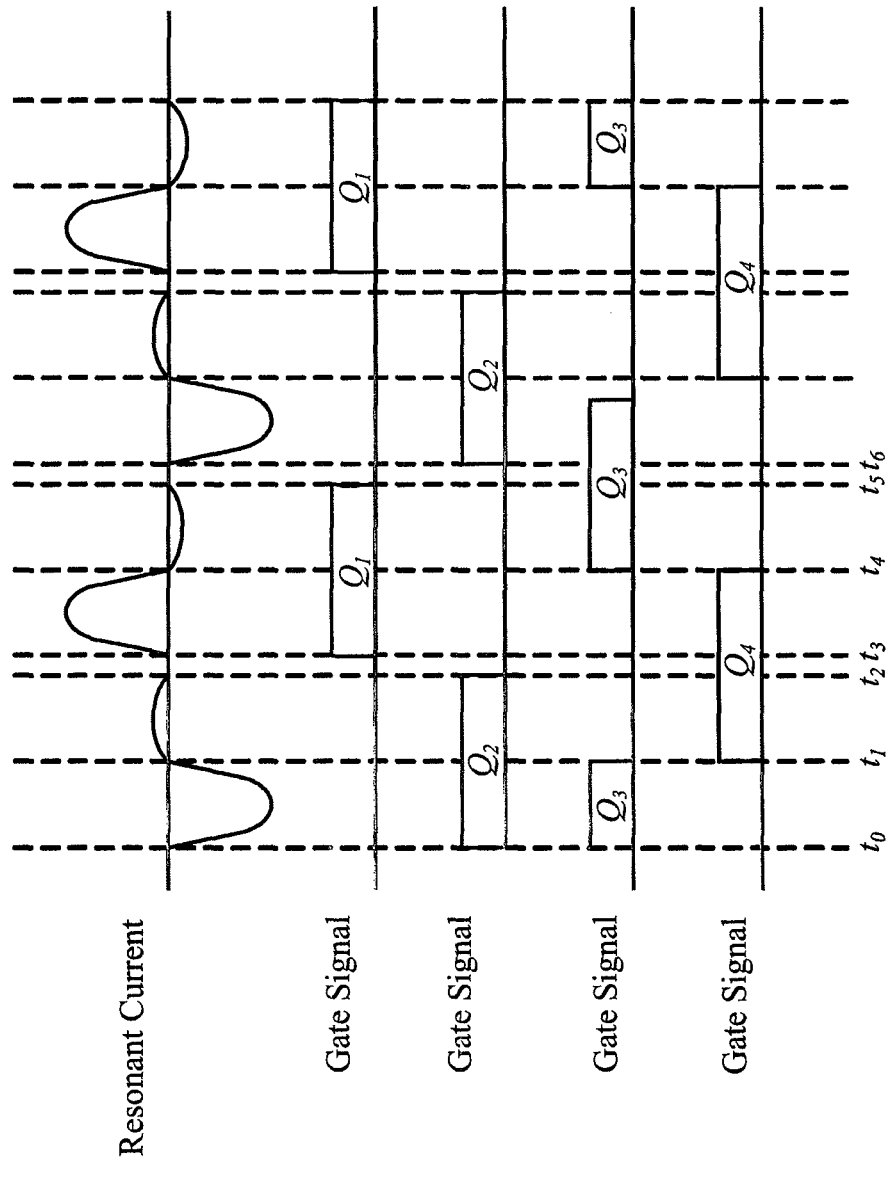

FIGS. 2C and 2D are different from the first embodiment shown in FIGS. 2A and 2B in that the driving method in FIGS. 2C and 2D involves first turning on the second switching element Q2 at the first lower arm and the third switching element Q3 at the second upper arm. Apart from this, other operations are similar to the driving method shown in FIGS. 2A and 2B, so they will not be further described.

Figure 3A:
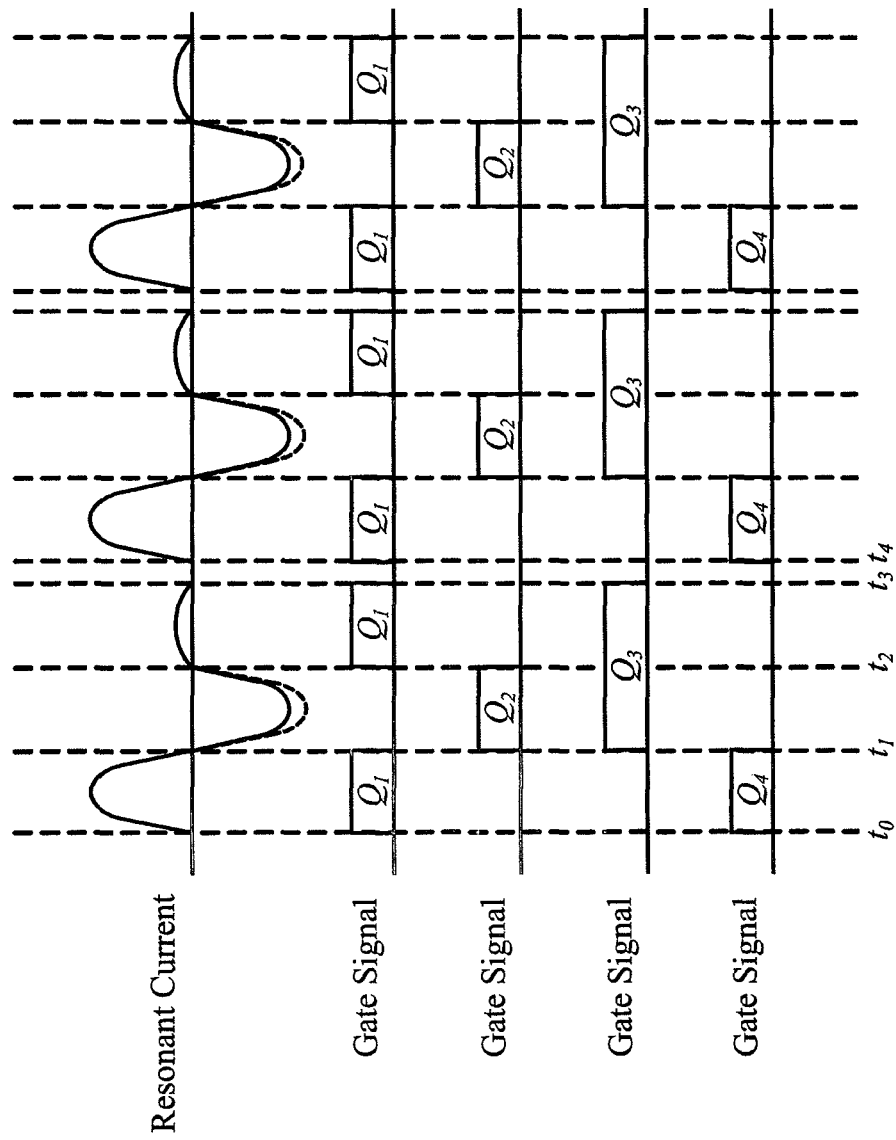
FIGS. 3A to 3D are waveform diagrams illustrating a driving method of soft switching the full-bridge quasi-resonant DC-DC converter in accordance with another embodiment of the present disclosure.
Figure 3B:
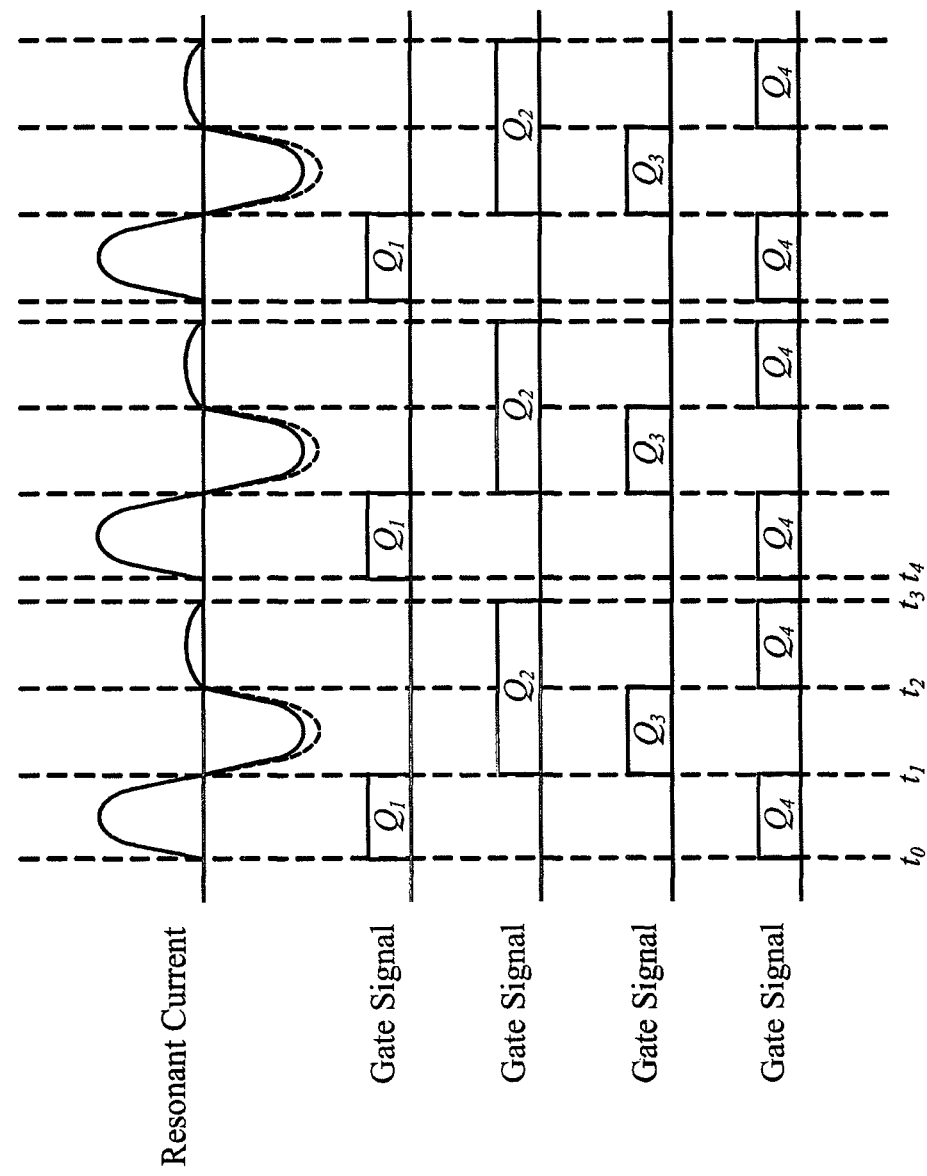

FIG. 3A to 3D are waveform diagrams illustrating a driving method of soft switching the full-bridge quasi-resonant DC-DC converter in accordance with another embodiment of the present disclosure. As shown in FIGS. 3A and 3B, based on the conduction states of the switching elements, the operations of the circuit are divided into time periods t0 to t4, and the operations in each of the periods t0 to t4 are described as follow:

(1) t0 to t1

The first switching element Q1 disposed at the first upper arm and the fourth switching element Q4 disposed at the second lower arm are turned, so as to transfer the electrical energy received at the input end 110 of the full-bridge converting circuit 11 from the primary winding 101 to the secondary winding 102, and the resonance capacitor 14 is being charged.

(2) t1 to t2

When no current flows through the first switching element Q1 and the fourth switching element Q4, the first switching element Q1 and the fourth switching element Q4 are turned off to achieve zero-current switching, and the second switching element Q2 and the third switching element Q3 are correspondingly turned on in order to continuously transfer the electrical energy received at the input end 110 of full-bridge converting circuit 11 from the primary winding 101 to the secondary winding 102, and the resonance capacitor 14 is being charged.

(3) t2 to t3

When no current flows through the second switching element Q2 and the third switching element Q3, the second switching element Q2 (see FIG. 3A) or the third switching element Q3 (see FIG. 3B) is turned off, and the first switching element Q1 or the fourth switching element Q4 is correspondingly turned on in order to transfer the electrical energy stored in the resonant capacitor 14 to the secondary winding 102.

(4) t3 to t4

This is a preset power-off output region. In an embodiment, since one process of releasing energy from the resonant capacitor 14 is eliminated, the root mean square (RMS) current of the full-bridge quasi-resonant DC-DC converter of the present disclosure can be reduced, thereby enhancing the overall efficiency.

Figure 3C:
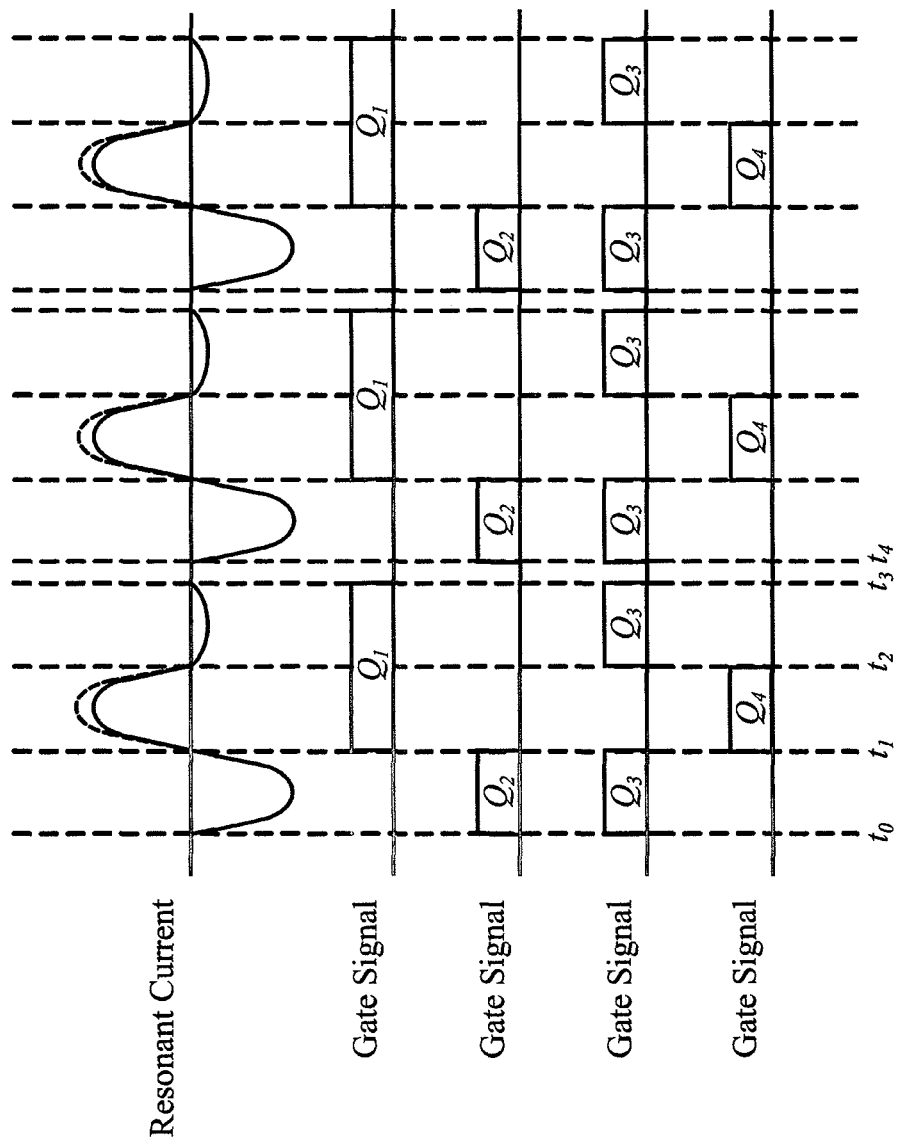
Figure 3D:
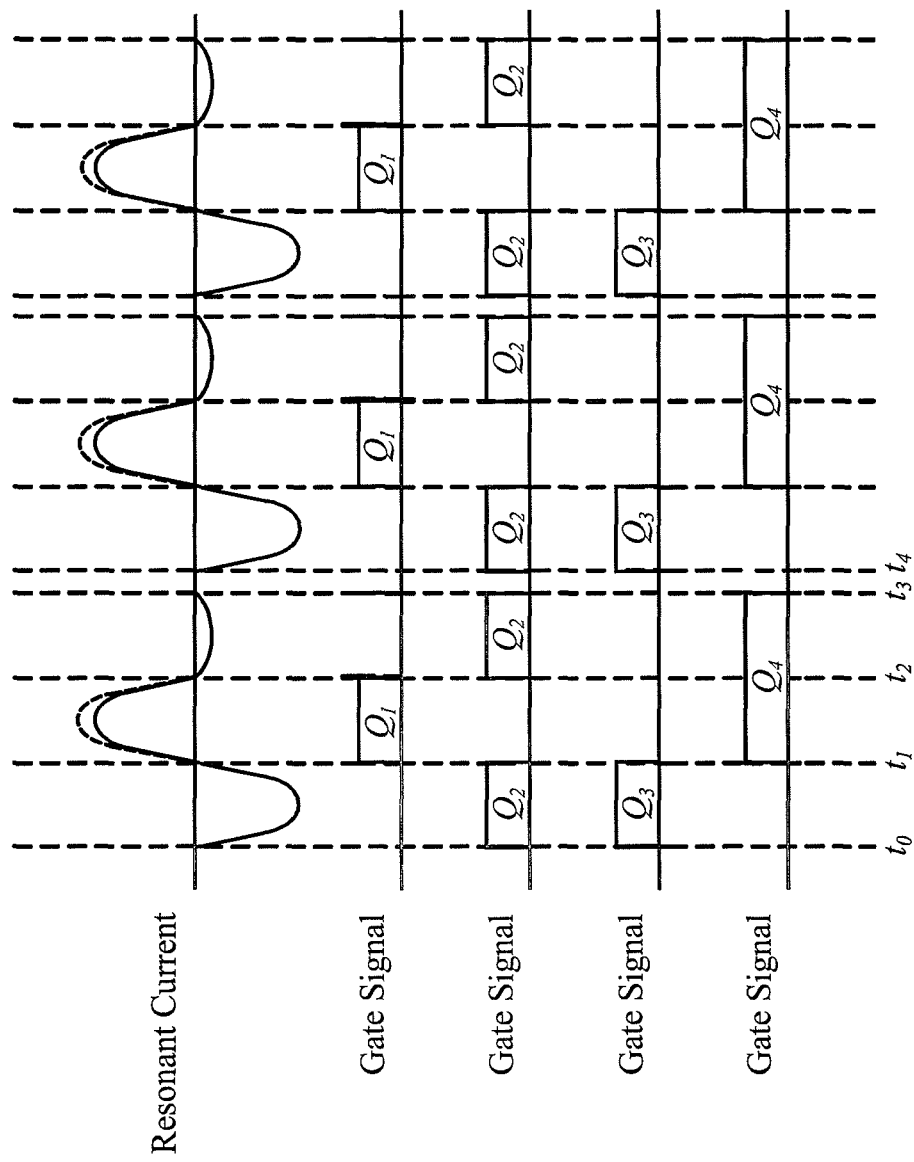

FIGS. 3C and 3D are different from the first embodiment shown in FIGS. 3A and 3B in that the driving method in FIGS. 3C and 3D involves first turning on the second switching element Q2 at the first lower arm and the third switching element Q3 at the second upper arm. Apart from this, other operations are similar to the driving method shown in FIGS. 3A and 3B, so they will not be further described.

Moreover, the driving method disclosed in the above embodiments are used for soft switching the full-bridge quasi-resonant DC-DC converter in accordance with the present disclosure; however, the present invention is not limited to this, but can be used to drive other types of DC-DC converters with a full-bridge converting circuit.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A full-bridge quasi-resonant DC-DC converter, comprising:
   a transformer including a primary winding and a secondary winding, wherein the secondary winding of the transformer includes two coils connected in series with each other;
   a full-bridge converting circuit including:
   a first arm circuit having a first switching element disposed at a first upper arm and a second switching element disposed at a first lower arm and connected in series with the first switching element;
   a second arm circuit connected in parallel with the first arm circuit, and having a third switching element disposed at a second upper arm and a fourth switching element disposed at a second lower arm and connected in series with the third switching element;
   an input end;
   an output end electrically connected with the primary winding of the transformer; and
   a resonant capacitor provided between the first arm circuit or the second arm circuit and the primary winding;
   a rectifier circuit electrically connected with the secondary winding of the transformer for rectifying signals generated by the secondary winding to produce output signals, wherein the rectifier circuit is a full-bridge rectifier circuit;
   a fifth switching element and a sixth switching element connected in series with the fifth switching element, wherein the rectifier circuit is connected in parallel with the fifth switching element and the sixth switching elements and convert the output signals of the rectifier circuit into AC signals through the fifth switching element and the sixth switching element; and a resonant inductor connected in series with the rectifier circuit,
wherein the resonant inductor and the resonant capacitor form a resonant circuit.

2. The full-bridge quasi-resonant DC-DC converter of claim 1, further comprising a first capacitor electrically connected with the input end of the full-bridge converting circuit for stabilizing a voltage inputted to the full-bridge converting circuit.

3. The full-bridge quasi-resonant DC-DC converter of claim 1, further comprising a second capacitor electrically connected with the rectifier circuit for filtering the output signals of the rectifier circuit.

4. The full-bridge quasi-resonant DC-DC converter of claim 1, wherein the fifth switching element and the sixth switching element are power metal oxide-semiconductor field-effect transistors (MOSFET).

5. The full-bridge quasi-resonant DC-DC converter of claim 1, wherein the first, the second, the third and the fourth switching elements are power metal oxide-semiconductor field-effect transistors (MOSFET).

6. The full-bridge quasi-resonant DC-DC converter of claim 1, wherein the primary winding of the transformer includes a coil.

7. The full-bridge quasi-resonant DC-DC converter of claim 6, wherein the secondary winding of the transformer is a center-tapped winding or a divided winding.

8. The full-bridge quasi-resonant DC-DC converter of claim 1, wherein the resonant inductor is disposed on the secondary winding of the transformer and serves as a filter inductor for filtering the output signals of the rectifier circuit.

9. A driving method of the full-bridge quasi-resonant DC-DC converter of claim 1, comprising the following steps of:
(1) turning on the first switching element at the first upper arm and the fourth switching element at the second lower arm so as to transfer electrical energy received at the input end of the full-bridge converting circuit from the primary winding of the transformer to the secondary winding, and charging the resonance capacitor;
(2) when no current flows through the first switching element and the fourth switching element, turning off one of the first switching element and the fourth switching element to achieve zero-current switching, and turning on one of the second switching element and the third switching element in order to transfer the electrical energy stored in the resonant capacitor during step (1) to the secondary winding;
(3) after going through a preset power-off output region, turning on the third switching element or the second switching element that is not yet turned on during step (2) to again transfer the electrical energy received at the input end from the primary winding of the transformer to the secondary winding, and charging the resonant capacitor; and
(4) when no current flows through the second switching element and the third switching element, turning off one of the second switching element and the third switching element to achieve zero-current switching, and turning on the first switching element or the fourth switching element in order to again transfer the electrical energy stored in the resonant capacitor during step (3) to the secondary winding.

10. A driving method of the full-bridge quasi-resonant DC-DC converter of claim 1, comprising the following steps of:
(1) turning on the second switching element at the first lower arm and the third switching element at the second upper arm so as to transfer electrical energy received at the input end of the full-bridge converting circuit from the primary winding of the transformer to the secondary winding, and charging the resonance capacitor;
(2) when no current flows through the second switching element and the third switching element, turning off one of the second switching element and the third switching element to achieve zero-current switching, and turning on one of the first switching element and the fourth switching element in order to transfer the electrical energy stored in the resonant capacitor during step (1) to the secondary winding;
(3) after going through a preset power-off output region, turning on the fourth switching element or the first switching element that is not yet turned on during step (2) to again transfer the electrical energy received at the input end from the primary winding of the transformer to the secondary winding, and charging the resonant capacitor; and
(4) when no current flows through the first switching element and the fourth switching element, turning off one of the first switching element and the fourth switching element to achieve zero-current switching, and turning on the second switching element or the third switching element in order to again transfer the electrical energy stored in the resonant capacitor during step (3) to the secondary winding.

11. A driving method of the full-bridge quasi-resonant DC-DC converter of claim 1, comprising the following steps of:
(1) turning on the first switching element at the first upper arm and the fourth switching element at the second lower arm so as to transfer electrical energy received at the input end of the full-bridge converting circuit from the primary winding of the transformer to the secondary winding, and charging the resonance capacitor;
(2) when no current flows through the first switching element and the fourth switching element, turning off the first switching element and the fourth switching element to achieve zero-current switching, and turning on the second switching element and the third switching element in order to continuously transfer the electrical energy received at the input end of the full-bridge converting circuit from the primary winding of the transformer to the secondary winding, and charging the resonant capacitor; and
(3) when no current flows through the second switching element and the third switching element, turning off one of the second switching element and the third switching element to achieve zero-current switching, and turning on the first switching element or the fourth switching element in order to transfer the electrical energy stored in the resonant capacitor during step (1) and step (2) to the secondary winding.

12. A driving method of the full-bridge quasi-resonant DC-DC converter of claim 1, comprising the following steps of:
(1) turning on the second switching element at the first lower arm and the third switching element at the second upper arm so as to transfer electrical energy received at the input end of the full-bridge converting circuit from the primary winding of the transformer to the secondary winding, and charging the resonance capacitor;
(2) when no current flows through the second switching element and the third switching element, turning off the second switching element and the third switching element to achieve zero-current switching, and turning on the first switching element and the fourth switching element in order to continuously transfer the electrical energy received at the input end of the full-bridge converting circuit from the primary winding of the transformer to the secondary winding, and charging the resonant capacitor; and (3) when no current flows through the first switching element and the fourth switching element, turning off one of the first switching element and the fourth switching element to achieve zero-current switching, and turning on the second switching element or the third switching element in order to transfer the electrical energy stored in the resonant capacitor during step (1) and step (2) to the secondary winding.

* * * * *